United States Patent
Lee et al.

(10) Patent No.: US 12,523,474 B2
(45) Date of Patent: Jan. 13, 2026

(54) METHOD, APPARATUS AND SYSTEM FOR MOTION TRACKING

(71) Applicants: University of Nottingham Ningbo China, Ningbo (CN); Nottingham Ningbo China Beacons of Excellence Research and Innovation Institute, Ningbo (CN)

(72) Inventors: Boon Giin Lee, Ningbo (CN); Renjie Wu, Ningbo (CN); Matthew Pike, Ningbo (CN); Xiaoqing Chai, Ningbo (CN)

(73) Assignees: University of Nottingham Ningbo China, Ningbo (CN); Nottingham Ningbo China Beacons of Excellence Research and Innovation Institute, Ningbo (CN)

( * ) Notice: Subject to any disclaimer, the term of this patent is extended or adjusted under 35 U.S.C. 154(b) by 285 days.

(21) Appl. No.: 18/038,654

(22) PCT Filed: Nov. 23, 2022

(86) PCT No.: PCT/CN2022/133675
§ 371 (c)(1),
(2) Date: May 24, 2023

(87) PCT Pub. No.: WO2023/142633
PCT Pub. Date: Aug. 3, 2023

(65) Prior Publication Data
US 2024/0361126 A1    Oct. 31, 2024

(30) Foreign Application Priority Data
Jan. 29, 2022 (CN) .......................... 202210112970.5

(51) Int. Cl.
G01C 21/16    (2006.01)
G01C 21/20    (2006.01)
G01C 22/00    (2006.01)

(52) U.S. Cl.
CPC ....... G01C 21/1652 (2020.08); G01C 21/206 (2013.01); G01C 22/006 (2013.01)

(58) Field of Classification Search
CPC ............ G01C 21/1652; G01C 21/206; G01C 22/006; G01C 21/165; G01C 23/00
See application file for complete search history.

(56) References Cited

U.S. PATENT DOCUMENTS 6,522,266 B1 *  2/2003  Soehren ................. G01S 5/017
                                                                600/595
8,600,699 B2 * 12/2013  Vock ...................... A63B 69/18
                                                                702/150

(Continued)

FOREIGN PATENT DOCUMENTS

CN      105091878 A     11/2015
CN      105241454 A      1/2016

(Continued)

OTHER PUBLICATIONS

International Search Report and Written Opinion issued for PCT/CN2022/133675, dated Feb. 20, 2023.

*Primary Examiner* — Donald J Wallace
*Assistant Examiner* — Jalal C Coduroglu
(74) *Attorney, Agent, or Firm* — Westman, Champlin & Koehler, P.A.; Z. Peter Sawicki; Amanda M. Prose (57) ABSTRACT

The present disclosure discloses a method, apparatus and system for motion tracking. The method includes: acquiring inertia information and pace ranging information of feet of a target object; determining step length information according to the inertia information and the pace ranging information; determining pace direction information according to (Continued)

the inertia information, and determining motion direction information of the target object according to the pace direction information; and determining a motion position of the target object according to the motion direction information and the step length information, and accordingly determining the motion track according to the motion position. By applying the technical schemes provided by embodiments of the present disclosure, the problem that an obvious accumulated drift error is likely to occur in direction estimation in the prior art, which interferes with position determination and brings negative effects can be solved, and beneficial effects of improving positioning accuracy and stability are achieved.

3 Claims, 2 Drawing Sheets

(56) References Cited

U.S. PATENT DOCUMENTS

| | | | |
|---|---|---|---|
| 11,614,796 B1* | 3/2023 | Summit | A63F 13/245 345/633 |
| 2007/0260418 A1* | 11/2007 | Ladetto | G06F 3/011 702/150 |
| 2011/0208444 A1* | 8/2011 | Solinsky | A61B 5/1114 702/41 |
| 2012/0101763 A1* | 4/2012 | Sambongi | G01C 21/12 702/97 |
| 2017/0241787 A1* | 8/2017 | Trigoni | G01C 21/12 |
| 2018/0075643 A1* | 3/2018 | Sequeira | G06T 7/579 |
| 2019/0028848 A1* | 1/2019 | Elias | G01C 22/006 |
| 2019/0283247 A1* | 9/2019 | Chang | A61B 5/1121 |
| 2021/0108935 A1* | 4/2021 | Koohi | G06Q 10/047 |

FOREIGN PATENT DOCUMENTS

| | | |
|---|---|---|
| CN | 111174781 A | 5/2020 |
| CN | 112539747 A | 3/2021 |
| CN | 114485647 A | 5/2022 |

* cited by examiner

METHOD, APPARATUS AND SYSTEM FOR MOTION TRACKING

CROSS-REFERENCE TO RELATED APPLICATION

This Application is a Section 371 National Stage Application of International Application No. PCT/CN2022/133675, filed Nov. 23, 2022 which claims priority to CN patent application No. 202210112970.5, filed Jan. 29, 2022, the contents of which are hereby incorporated by reference in their entirety.

TECHNICAL FIELD

The present disclosure relates to positioning technologies, and more particularly relates to a method, apparatus and system for motion tracking.

BACKGROUND ART

In recent years, with the acceleration of the urbanization process, the number of large-scale buildings with complex indoor structures such as commercial complex buildings, large residential apartments, and large-scale industrial plants and parks is increasing day by day. Although a large building area and fine indoor functional partition satisfy production and living site requirements of more citizens, it is also possible to bring many potential hazards to the field of fire safety. As main force of fire rescue work, firefighters are committed to teamwork and pull together in the rescue process, so as to achieve the purpose of efficient rescue. However, in indoor rescue work, the firefighters, limited by visibility, limited wireless communication signal connection and blocked GPS signal communication, cannot know current position information of per se and the teammate, cannot record the route they have taken and the surrounding environment, and can only abstractly describe the surrounding building structure and the location in an interphone talkback mode. In case of emergency, the lack of effective positioning means may result in threatening the life safety of the firefighters and meanwhile bring great resistance to a commander issuing commands and follow-up backup work.

In the prior art, the position information can be estimated, through an inertial sensor-based attitude estimation algorithm, according to inertia data of a wearer during movement. However, the algorithm is not accurate enough in pace detection, and calculation of step length and other processes, an obvious accumulated drift error is likely to occur in pace direction estimation due to the difference of gait habit of the wearer, and in the complex indoor rescue environment, the accumulated error will interfere with position determination to a great degree, and even will bring negative effects.

SUMMARY OF THE INVENTION

The present disclosure provides a method, apparatus and system for motion tracking, so as to achieve effects of improving positioning accuracy and stability.

According to one aspect of the present disclosure, a method for motion tracking is provided, and the method includes:
acquiring inertia information and pace ranging information of feet of a target object;
determining step length information according to the inertia information and the pace ranging information;
determining pace direction information according to the inertia information, and determining motion direction information of the target object according to the pace direction information; and
determining a motion position of the target object according to the motion direction information and the step length information, and accordingly determining the motion track according to the motion position.

According to another aspect of the present disclosure, an apparatus for motion tracking is provided, and the apparatus includes:
an information acquiring module, configured to acquire inertia information and pace ranging information of feet of a target object;
a step length information determining module, configured to determine step length information according to the inertia information and the pace ranging information;
a motion direction information determining module, configured to determine pace direction information according to the inertia information, and determine motion direction information of the target object according to the pace direction information; and
a motion track determining module, configured to determine a motion position of the target object according to the motion direction information and the step length information, and accordingly determine the motion track according to the motion position.

According to another aspect of the present disclosure, a system for motion tracking is provided, and the system includes: a sensor module, a data transmission module and a data processing module; the sensor module includes: an inertial sensor and a pace ranging sensor; the inertial sensor is arranged on the instep of a target object, and the pace ranging sensor is arranged on the heel of the target object;
the inertial sensor is configured to acquire inertia information of the feet of the target object;
the pace ranging sensor is configured to acquire pace ranging information of the feet of the target object;
the data transmission module is configured to transmit the inertia information and the pace ranging information to the data processing module; and
the data processing module is configured to determine step length information according to the inertia information and the pace ranging information; determine pace direction information according to the inertia information and determine motion direction information of the target object according to the pace direction information; determine a motion position of the target object according to the motion direction information and the step length information, and accordingly determine the motion track according to the motion position.

According to the technical scheme of embodiments of the present disclosure, the inertia information and the pace ranging information of the feet of the target object are acquired; the step length information is determined according to the inertia information and the pace ranging information; the pace direction information is determined according to the inertia information, and the motion direction information of the target object is determined according to the pace direction information; and the motion position of the target object is determined according to the motion direction information and the step length information, and accordingly, the motion track is determined according to the motion position. The problem that an obvious accumulated drift error is likely to occur in direction estimation in the prior art, which interferes with position determination and brings negative effects is solved, and beneficial effects of improving positioning accuracy and stability are achieved.

It is to be understood that the content described in this section is not intended to mark key or important features of the embodiments of the present disclosure, and is not used for limiting the scope of the present disclosure neither. Other features of the present disclosure are easier to understand through the following description.

DETAILED DESCRIPTION OF THE INVENTION

To make those skilled in the art better understand schemes of the present disclosure, the technical schemes in the embodiments of the present disclosure are clearly and integrally described in combination with drawings in the embodiments of the present disclosure as below. It is apparent that the described embodiments are merely a part rather than all embodiments of the present disclosure. Based on the embodiments in the present disclosure, all other embodiments obtained by those of ordinary skill in the art without creative labor shall fall within the scope of protection of the present disclosure.

It needs to be explained that terms such as "first", "second" and "target" in the description and the claims of the present disclosure and the above drawings are used for distinguishing similar objects but not necessarily used for describing specific sequences or precedence orders. It is to be understood that data used in this way can be exchanged under proper situations, so that the described embodiments of the present disclosure can be implemented in sequences except the illustrated or described sequences herein. In addition, terms "include" and "have" and any variation thereof are intended to cover non-exclusive inclusion. For example, a process, method, system, product or device including a series of steps or units is not limited to those steps or units that are clearly listed, but may include other steps or units that are unclearly listed or are inherent to the process, method, product or device.

Example 1

Figure 1:
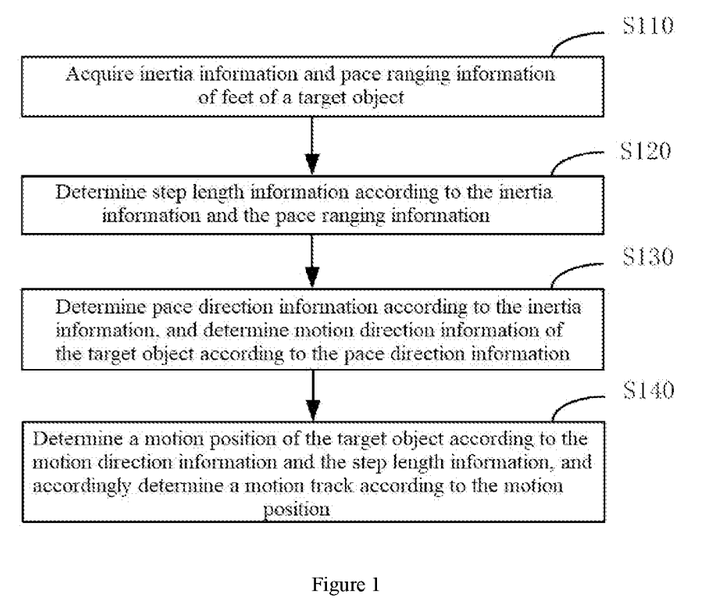
FIG. 1 is a flowchart of a method for motion tracking provided by Example 1 of the present disclosure.

FIG. 1 is a flowchart of a method for motion tracking provided by Example 1 of the present disclosure. The present example is applicable to a situation of determining an indoor motion track of a target object. The method may be executed by an apparatus for motion tracking provided by an example of the present disclosure, and the apparatus may be implemented in a mode of software and/or hardware. Referring to FIG. 1, the method for motion tracking provided by the present example includes:

S110: Acquire inertia information and pace ranging information of feet of a target object.

The target object is an object whose positioning information needs to be acquired; the inertia information and the pace ranging information of the feet of the target object may be acquired by articles put on the feet of the target object, such as different sensors arranged on fire fighting protective boots of a firefighter, for example, the inertia information is acquired by an inertial sensor, and the pace ranging information is acquired by a ranging sensor.

The inertia information of a single foot may include motion angular speed and acceleration, an attitude euler angle calculated in the sensors, and the like. The pace ranging information may include a distance between a heel of the single foot and the ground in the movement process of the target object and the like.

S120: Determine step length information according to the inertia information and the pace ranging information.

The step length information is length information between adjacent paces of the target object. The step of determining the step length information according to the inertia information and the pace ranging information may be specifically as follows: a time point when each pace makes contact with the ground can be determined according to the pace ranging information, and the time point is regarded as a time point corresponding to the pace, and the step length information is determined by calculating a standard difference of accelerations between the paces, a time difference between adjacent paces and the like.

In the present example, optionally, the step of determining the step length information according to the inertia information and the pace ranging information includes:

a first candidate pace time point set is determined according to the inertia information;

a second candidate pace time point set is determined according to the pace ranging information;

a target pace time point set is determined according to the first candidate pace time point set and the second candidate pace time point set; and the step length information is determined according to the inertia information of paces corresponding to target pace time points in the target pace time point set.

The candidate pace time point sets are sets of time points corresponding to candidate paces, and once the foot makes contact with the ground at a time, it is regarded as one candidate pace.

The first candidate pace time point set is determined according to the inertia information. When the target object takes a step, the foot has a downward acceleration, the time when the downward acceleration reaches the maximum may be the time when the foot makes contact with the ground, and thus, the time when a valley of a filtered acceleration mode value is solved may serve as the time point corresponding to the candidate pace. All time points serve as the first candidate pace time point set.

The second candidate pace time point set is determined according to the pace ranging information. When the target object takes a step, the heel will leave the ground, the time when the distance between the heel and the ground becomes the minimum may be the time when the foot makes contact with the ground, and thus, the landing time obtained according to a periodical leg lifting and falling distance change rule may serve as the time point corresponding to the candidate pace. All time points serve as the second candidate pace time point set.

The step of determining the target pace time point set according to the first candidate pace time point set and the second candidate pace time point set may be specifically as follows: whether the first candidate pace time point set is correct or not can be determined with the assistance of the second candidate pace time points, for example, whether the first candidate time point set has a time point greatly different from other time points therein or not, if yes, it is necessary to determine whether the time point at the same time in the second candidate pace time point set has the same difference or not, if yes, the specific time point is subject to the first candidate time point set, and if not, the specific time point is subject to the second candidate time point set.

The calibrated time point set is regarded as the target pace time point set. According to the inertia information of paces corresponding to target pace time points in the target pace time point set, for example, if the right foot is ahead of the left foot at the moment, current step length information is determined according to a time point when the right foot steps on the ground, a standard difference of acceleration between the left foot and the right foot, and a time difference between adjacent time points in the target pace time point set, and step length information at the next moment can be calculated according to a situation that the left foot is ahead of the right foot, so as to acquire continuous step length information.

The target pace time point set is determined jointly by the first candidate pace time point set and the second candidate pace time point set, so as to improve the accuracy of pace time point determination. According to the inertia information of the paces corresponding to the target pace time points in the target pace time point set, the step length information is determined, and the accuracy of step length information determination is improved.

S130: Pace direction information is determined according to the inertia information, and motion direction information of the target object is determined according to the pace direction information.

The pace direction information is single direction information, and may be pace direction angle information, and the motion direction information may be overall orientation information of the target object during movement, and may also be direction angle information.

The step of determining the pace direction information according to the inertia information may be specifically as follows: a state of each footstep can be accurately determined by extracting an angular velocity peak value and a course angle change rate between paces, and the pace direction information is determined by accumulating angle information corresponding to each state.

The step of determining the motion direction information of the target object according to the pace direction information may be specifically as follows: the motion direction information can be obtained by combining pace directions of the both feet, and the motion direction information may also be determined according to the pace direction information of a single foot, which is not limited by the present example.

S140: A motion position of the target object is determined according to the motion direction information and the step length information, and accordingly, the motion track is determined according to the motion position.

A walking direction and distance of every step of the target object are determined according to the motion direction information and the step length information, accordingly, current motion positions of the target object are sequentially determined from a start point, and the motion positions are sequentially connected to form the motion track.

According to the technical scheme provided by the present example, the inertia information and the pace ranging information of the feet of the target object are acquired; the step length information is determined according to the inertia information and the pace ranging information; the pace direction information is determined according to the inertia information, and the motion direction information of the target object is determined according to the pace direction information; and the motion position of the target object is determined according to the motion direction information and the step length information, and accordingly, the motion track is determined according to the motion position. The stable and accurate motion track is generated to assist in indoor positioning and path seeking.

When positioning is performed through the inertial sensor, the pace direction estimated drift error will be relatively large if only a course angle provided by the inertial sensor serves as the motion direction of the target object while the gait habit of the target object is ignored. For example, the target object actually walks forwards, but because the gait habit of the target object during forward walking is that the pace faces the left front, the pace direction determined by the inertial sensor is left front, which has a drift error with an actual pace direction. In addition, when a current pace direction is obtained through accumulation based on the previous pace direction, due to the drift error problem, an obvious accumulated drift error is likely to be caused, which interferes with position determination and brings negative effects. The technical scheme provided by the present example determines the accurate pace direction, thereby solving the above problems, and improving positioning accuracy and stability.

Example 2

Figure 2:
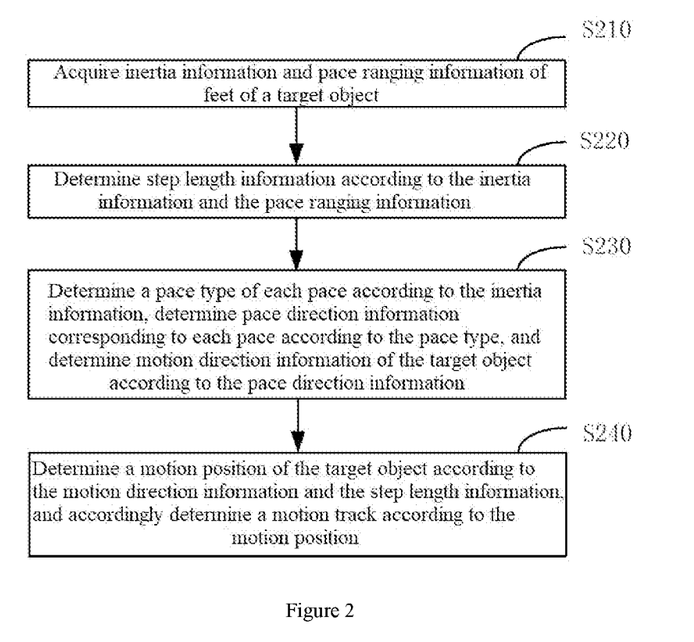
FIG. 2 is a flowchart of a method for motion tracking provided by Example 2 of the present disclosure.

FIG. 2 is a flowchart of a method for motion tracking provided by Example 2 of the present disclosure. The present technical scheme makes supplemental instruction for the process of determining the pace direction information according to the inertia information. Compared with the above scheme, the present scheme is specifically optimized in that the step of determining the pace direction information according to the inertia information includes:

a pace type of each pace is determined according to the inertia information, and the pace direction information corresponding to each pace is determined according to the pace type. Specifically, the flowchart of the method for motion tracking is shown in FIG. 2:

S210: Inertia information and pace ranging information of feet of a target object are acquired.

S220: Step length information is determined according to the inertia information and the pace ranging information.

S230: A pace type of each pace is determined according to the inertia information, the pace direction information corresponding to each pace is determined according to the pace type, and motion direction information of the target object is determined according to the pace direction information.

The pace type may be at least one of going straight, turning left, turning right, turning around in the left direction and turning around in the right direction, and a corresponding pace state label may be determined for each pace type, such as labels 0, 1, 2, 3 and 4, which respectively denotes going straight, turning left, turning right, turning around in the left direction and turning around in the right direction, which is not limited by the present example.

According to an euler angle and an angular speed in the inertia information, a course angle and a z-axis angular speed are respectively extracted to serve as main calculation references. After the angular speed and the unwrapped course angle are subjected to lowpass filtering calculation, step motion state collaborative determination is performed. The pace types are determined according to an angular speed crest and valley and a course angle change rate. Each pace type corresponds to a fixed direction and a fixed angle, for example, turning left corresponds to −90°, turning right corresponds to +90°, turning around in the left direction corresponds to −180°, and turning around in the right direction corresponds to +180°.

After the pace type corresponding to each pace of a single foot is determined, the angle of the previous pace and the angle corresponding to the current pace type are added to obtain current pace direction information of the pace.

Motion direction information is obtained by combining pace directions of the both feet, and the motion direction information may also be determined based on the pace direction information of a single foot, which is not limited by the present example.

In the present example, optionally, the step of determining the motion direction information of the target object according to the pace direction information includes:

the motion direction information is obtained by performing filtering fusion processing on the pace direction information corresponding to the both feet.

The pace direction information of the both feet at the same time is subjected to filtering fusion, so as to improve detection precision, and reduce adverse effects caused by inaccurate single foot data.

In the present example, optionally, after the pace direction information is obtained, the method further includes:

whether a continuous turning pace set exists or not is determined according to the pace type; and if yes, set direction information corresponding to the continuous turning pace set is acquired, and pace types of paces in the continuous turning pace set are updated according to the set direction information.

The continuous turning pace set is a set constituted by continuous paces the same in pace type, for example, the pace labels corresponding to four continuous steps are all label 1, and thus, the four paces constitute the continuous turning pace set.

The set direction information is integral set direction information, for example, integral turning information from a pace 1 to a pace 4 may be determined with the course angle in the inertia information as a reference, and for example, the course angle from the pace 1 to the pace 4 indicates turning left totally by 95°. At the time, the labels of the pace 1, the pace 2 and the pace 4 are updated into 0, and the label of the pace 3 is kept as 1.

A manner for updating the pace types of the paces in the continuous turning pace set can keep the label of the pace with great angle change unchangeable, and update the label of the pace with small angle change into the pace type corresponding to going straight.

Random little steps are a kind of motion state mainly existing in turning. People may turn by one side or turn around by several continuous and short small-range turning actions (less than 45°, and the random little steps similarly cause obvious pulse signals in a gyroscope signal diagram, which interfere with normal turning state determination. The above manner is adopted to eliminate influences of the random little steps in turning on pace state assignment, and improve the accuracy of actual pace type determination.

S240: A motion position of the target object is determined according to the motion direction information and the step length information, and accordingly, the motion track is determined according to the motion position.

According to the present example of the present disclosure, the pace type of each pace is determined according to the inertia information, and the pace direction information corresponding to each pace is determined according to the pace type, the accuracy of determining direction information of each pace is improved, so that a small deviation existed in a turning direction of a single pace is corrected to be closest to one of four main directions: east, west, south and north, and accordingly, an accumulated error caused by inaccurate pace direction estimation is avoided.

Example 3

Figure 3:
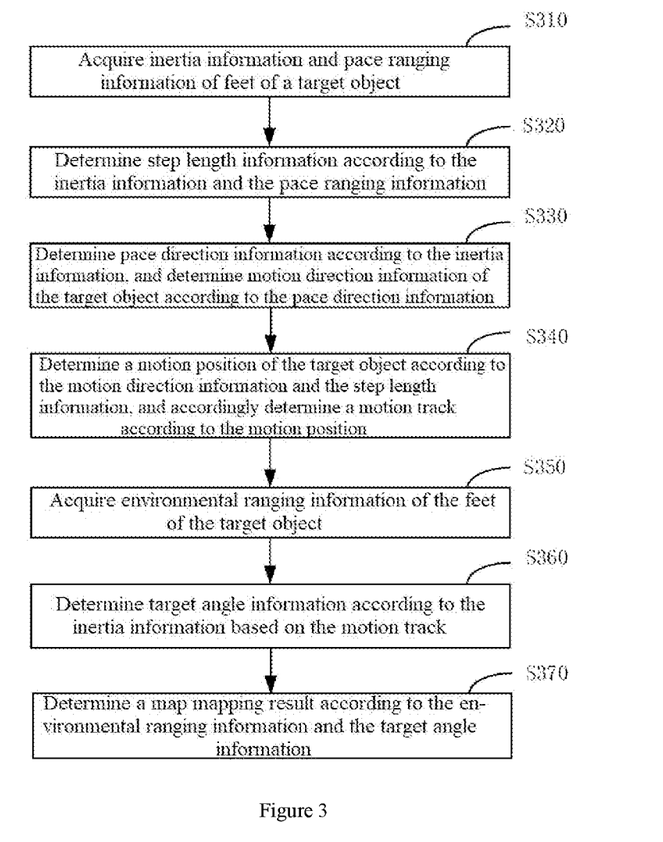
FIG. 3 is a flowchart of a method for motion tracking provided by Example 3 of the present disclosure.

FIG. 3 is a flowchart of a method for motion tracking provided by Example 3 of the present disclosure. The technical scheme makes supplemental instruction for a mapping process. Compared with the above scheme, the present scheme is specifically optimized to further include:

environmental ranging information of feet of a target object is acquired;

target angle information is determined according to the inertia information based on the motion track; and a map mapping result is determined according to the environmental ranging information and the target angle information. The specific flowchart of the method for motion tracking is shown in FIG. 3:

S310: Inertia information and pace ranging information of feet of a target object are acquired.

S320: Step length information is determined according to the inertia information and the pace ranging information.

S330: Pace direction information is determined according to the inertia information, and motion direction information of the target object is determined according to the pace direction information.

S340: A motion position of the target object is determined according to the motion direction information and the step length information, and accordingly, the motion track is determined according to the motion position.

S350: Environmental ranging information of the feet of the target object is acquired.

The environmental ranging information includes distances between foot outer sides and surrounding obstacles, which can be simultaneously acquired together with the inertia information and the pace ranging information.

After the environmental ranging information, the inertia information and the pace ranging information are acquired, the information can be preprocessed, preprocessing contents may include timestamp alignment of information data and sieving-out of value abrupt noise data and other abnormal data in the information, thereby ensuring a stable subsequent running process.

S360: Target angle information is determined according to the inertia information based on the motion track.

The target angle information is an included angle between the motion track and an actual pace direction, where the actual pace direction can be determined according to the inertia information. The corresponding target angle information on the motion track is calculated.

S370: A map mapping result is determined according to the environmental ranging information and the target angle information.

According to the principle of a laser occupancy grid map, the environmental ranging information and the target angle information are combined along generated track coordinates to calculate a point set of left obstacles corresponding to the left foot, such as an edge point set of a wall, a table and chair and other obstacles, and a point set of right obstacles corresponding to the right foot, and maps of the two sides of the target object are respectively constructed according to the left point set and the right point set.

Optionally, the mapping result is optimized according to different walking modes of the target object, and the exemplary walking modes may include corner walking, circle position walking, repeated position walking and the like. Map point features are extracted in the movement process of the target object, and during mapping, current map point features and previous extracted map point features are matched, and thus, the walking mode is determined according to a matching result.

Part of error points in map points are eliminated according to different walking modes, for example, when the walking mode is repeated position walking, that is, the target object repeatedly walks at the same position, such as walking back and forth, greatly different points at the same position are sieved out. Thus, readability and accuracy of the map mapping result are improved.

In the present example, optionally, the motion track and/or the map mapping result can be visually displayed.

Visual display may be real-time display, and a display object may be a remote terminal and may also be a terminal at the target object, which is not limited by the present example.

Through visually displaying the motion track and/or the map mapping result, the target object or other personnel can easily know the current location of per se and other people, a movable position and the like, thereby improving the effectiveness and practicability of motion track and/or map mapping result determination.

According to the example of the present disclosure, the environmental ranging information of the feet of the target object is acquired based on the motion track; the target angle information is determined according to the inertia information; and the map mapping result is determined according to the environmental ranging information and the target angle information, and a cognizable map is generated, thereby solving the problem about map lack in the prior art, and assisting the target object or other personnel in indoor positioning and path seeking.

Example 4

Figure 4:
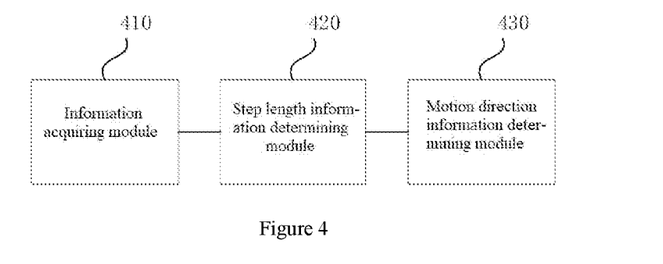
FIG. 4 is a schematic structural diagram of an apparatus for motion tracking provided by Example 4 of the present disclosure.

FIG. 4 is a schematic structural diagram of an apparatus for motion tracking provided by Example 4 of the present disclosure. The apparatus may be implemented in the form of hardware and/or software, can execute the method for motion tracking provided by any example of the present disclosure, and has corresponding functional modules and beneficial effects for executing the method. As shown in FIG. 4, the apparatus includes:
- an information acquiring module 410, configured to acquire inertia information and pace ranging information of feet of a target object;
- a step length information determining module 420, configured to determine step length information according to the inertia information and the pace ranging information;
- a motion direction information determining module 430, configured to determine pace direction information according to the inertia information, and determine motion direction information of the target object according to the pace direction information; and
- a motion track determining module 440, configured to determine a motion position of the target object according to the motion direction information and the step length information, and accordingly determine the motion track according to the motion position.

Based on the above various technical schemes, optionally, the step length information determining module includes:
- a first time point set determining unit, configured to determine a first candidate pace time point set according to the inertia information;
- a second time point set determining unit, configured to determine a second candidate pace time point set according to the pace ranging information;
- a target time point set determining unit, configured to determine a target pace time point set according to the first candidate pace time point set and the second candidate pace time point set; and
- a step length information determining unit, configured to determine step length information according to the inertia information of paces corresponding to target pace time points in the target pace time point set.

Based on the above various technical schemes, optionally, the motion direction information determining module includes:
- a pace direction information determining unit, configured to determine pace types of paces according to the inertia information, and determine the pace direction information corresponding to each pace according to the pace type.

Based on the above various technical schemes, optionally, the motion direction information determining module includes:
- a motion direction information determining unit, configured to obtain the motion direction information by performing filtering fusion processing on the pace direction information corresponding to the both feet.

Based on the above various technical schemes, optionally, the apparatus further includes:
- a pace set determining module, configured to determine whether a continuous turning pace set exists or not according to the pace type after the motion direction information determining module performs actions to obtain the pace direction information; and
- a pace type updating module, configured to acquire set direction information corresponding to the continuous turning pace set if the pace set determining module confirms yes, and update the pace types of the paces in the continuous turning pace set according to the set direction information.

Based on the above various technical schemes, optionally, the apparatus further includes:
- an environmental ranging information acquiring module, configured to acquire environmental ranging information of the feet of the target object;
- a target angle information determining module, configured to determine target angle information according to the inertia information based on the motion track; and
- a map mapping result determining module, configured to determine a map mapping result according to the environmental ranging information and the target angle information.

Based on the above various technical schemes, optionally, the apparatus further includes:
- a result visual displaying module, configured to visually display the motion track and/or the map mapping result.

Example 5

Figure 5:
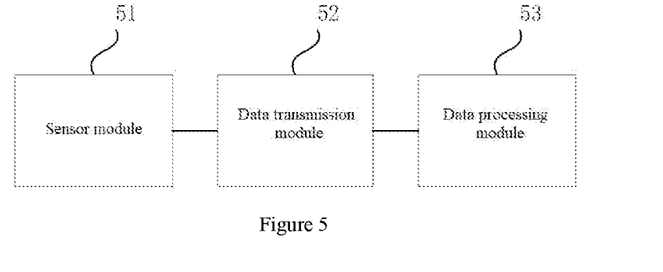
FIG. 5 is a constitutional diagram of a system for motion tracking provided by Example 5 of the present disclosure.

FIG. 5 is a constitutional diagram of a system for motion tracking provided by Example 5 of the present disclosure. As shown in FIG. 5, the system includes a sensor module 51, a data transmission module 52 and a data processing module 53. The sensor module 51 includes an inertial sensor and a pace ranging sensor. The inertial sensor is arranged on the instep of a target object, and the pace ranging sensor is arranged on the heel of the target object.

The inertial sensor is configured to acquire inertia information of feet of the target object.

The pace ranging sensor is configured to acquire pace ranging information of the feet of the target object.

The data transmission module 52 is configured to transmit the inertia information and the pace ranging information to the data processing module 53.

The data processing module 53 is configured to determine step length information according to the inertia information and the pace ranging information; determine pace direction information according to the inertia information and determine motion direction information of the target object according to the pace direction information; determine a motion position of the target object according to the motion direction information and the step length information, and accordingly determine the motion track according to the motion position.

The pace ranging sensor may be an ultrasonic ranging and/or laser ranging sensor, and the sensor type can be switched according to different indoor environments. For example, the ultrasonic ranging sensor is adopted in a situation of low visibility.

The data transmission module 52 may transmit data through a wireless transport protocol, for example, Lora is used as a main wireless transport protocol, a new-generation WLAN protocol or other more stable and more cost-effective schemes may also be adopted, which is not limited by the present example.

The data processing module 53 is a terminal such as an electronic computer carrying a wireless transmission receiving end module for data processing.

The sensor module 51 transmits the data into a microprocessor in the sensor module 51, the microprocessor transmits, by a serial port, data to a transmitting end of the data transmission module 52, and transmits the data, in a form of message via the wireless transport protocol, to the data processing module 53 equipped with a signal receiving module, and after the message is decoded, the inertia information, the pace ranging information and the like collected from the sensor module 51 can be acquired.

In the present example, optionally, the sensor module 51 further includes: an environmental ranging sensor, the environmental ranging sensor is arranged on an outer side of the foot of the target object.

The environmental ranging sensor is configured to acquire environmental ranging information of the foot of the target object.

The data processing module 53 is further configured to determine target angle information according to the inertia information based on the motion track, and determine a map mapping result according to the environmental ranging information and the target angle information.

The environmental ranging sensor may be an ultrasonic ranging sensor.

According to the technical scheme of the example of the present disclosure, through the sensor module 51 and the data transmission module 52 fixed to the feet of the target object, the apparatus is portable, rapid in positioning, and capable of adapting to darkness, smog and other severe indoor environments, so as to overcome adverse effects on calculation caused by gait habits, provide the visual and accurate motion track and/or indoor map, facilitate rescue and other activities to be safely carried out, and fill a vacancy of an indoor positioning and mapping system in the fire fighting field. Meanwhile, a high-performance inertial sensor is usually adopted in the prior art to estimate the position, which cannot be actually configured in a daily device due to high hardware cost, while the hardware adopted in the present system is low in cost, and volume production is facilitated.

It is to be understood that various forms of processes shown above may be adopted to re-arrange, add or delete steps. For example, the steps recorded in the present disclosure may be executed in parallel, or executed in sequence, or executed in different sequences, which is not limited in the present disclosure as long as the result expected by the technical schemes of the present disclosure can be realized.

The foregoing specific implementations do not limit the scope of protection of the present disclosure. Those skilled in the art should understand that various modifications, combinations, sub-combinations and substitutions may be performed according to design demands and other factors. Any modification, equivalent replacement, improvement and the like made within the spirit and principle of the present disclosure shall fall within the scope of protection of the present disclosure.

The invention claimed is:

1. An apparatus for motion tracking, comprising:
an information acquiring module, configured to acquire inertia information and pace ranging information of feet of a target object;
a step length information determining module, configured to determine step length information according to the inertia information and the pace ranging information;
a motion direction information determining module, configured to determine pace direction information according to the inertia information, and determine motion direction information of the target object according to the pace direction information; and
a motion track determining module, configured to determine a motion position of the target object according to the motion direction information and the step length information, and accordingly determine the motion track according to the motion position.

2. A system for motion tracking, comprising: a sensor module, a data transmission module and a data processing module, wherein the sensor module comprises: an inertial sensor and a pace ranging sensor, the inertial sensor is arranged on the instep of a target object, and the pace ranging sensor is arranged on the heel of the target object;
the inertial sensor is configured to acquire inertia information of the feet of the target object;
the pace ranging sensor is configured to acquire pace ranging information of the feet of the target object;
the data transmission module is configured to transmit the inertia information and the pace ranging information to the data processing module; and
the data processing module is configured to determine step length information according to the inertia information and the pace ranging information; determine pace direction information according to the inertia information and determine motion direction information of the target object according to the pace direction information; determine a motion position of the target object according to the motion direction information and the step length information, and accordingly determine the motion track according to the motion position.

3. The system according to claim 2, wherein the sensor module further comprises: an environmental ranging sensor, the environmental ranging sensor is arranged on an outer side of the foot of the target object;
- the environmental ranging sensor is configured to acquire environmental ranging information of the foot of the target object; and
- the data processing module is further configured to determine target angle information according to the inertia information based on the motion track, and determine a map mapping result according to the environmental ranging information and the target angle information.

* * * * *